United States Patent [19]
Rogers

[11] 3,905,711
[45] Sept. 16, 1975

[54] CABLE CONNECTING ASSEMBLY
[75] Inventor: James B. Rogers, Lakeland, Fla.
[73] Assignee: Marion Power Shovel Company, Inc., Marion, Ohio
[22] Filed: Oct. 31, 1974
[21] Appl. No.: 519,775

[52] U.S. Cl................ 403/16; 403/211; 24/115 M
[51] Int. Cl.².......................................... F16G 11/04
[58] Field of Search............. 403/210, 211, 213, 16; 24/115 M, 136 K

[56] References Cited
UNITED STATES PATENTS
| | | | |
|---|---|---|---|
| 1,248,991 | 12/1917 | Barger | 403/213 |
| 3,335,470 | 8/1967 | Baer | 403/211 |

Primary Examiner—Andrew V. Kundrat
Attorney, Agent, or Firm—Mason, Fenwick & Lawrence

[57] ABSTRACT

A cable connecting assembly generally consisting of a socket member having a passageway therethrough including converging, cable engaging surfaces and means for securing the socket member to a desired object and a wedge assembly receivable within the passageway of the socket member including a pair of wedge members and a spreader member, the spreader member having a pair of converging, wedge engaging surfaces, a forwardly projecting anvil disposed at a forward end thereof, extending beyond a forward end of the socket member when the wedge assembly is disposed within the passageway of the socket, and a cable engaging surface disposed at a rearward end thereof, each of the wedge members including a surface engagable with a wedge engaging surface of the spreader member and a surface engagable with a cable segment engaging a converging surface of the socket member when the wedge assembly is disposed within the passageway of the socket member.

17 Claims, 6 Drawing Figures

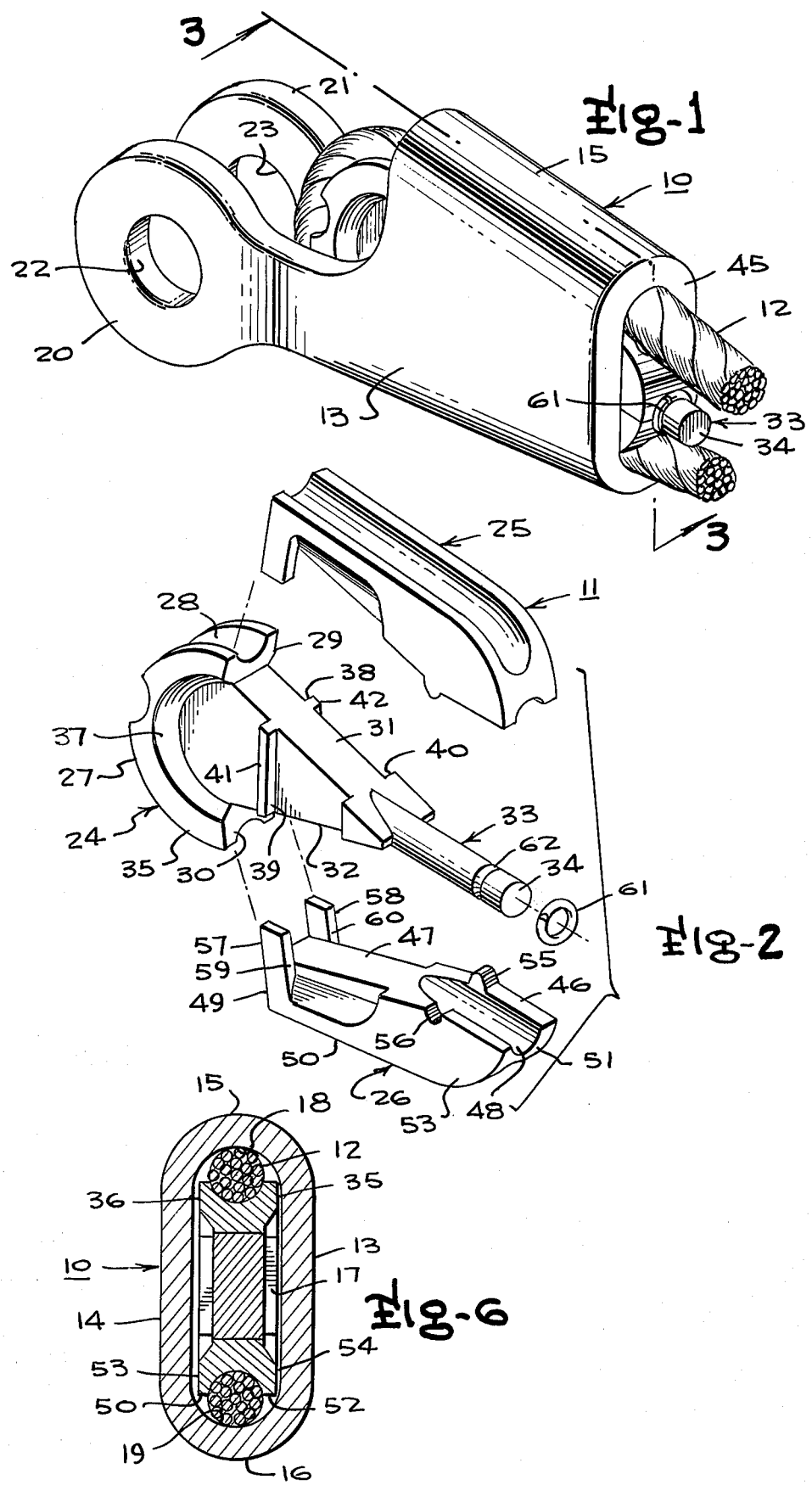

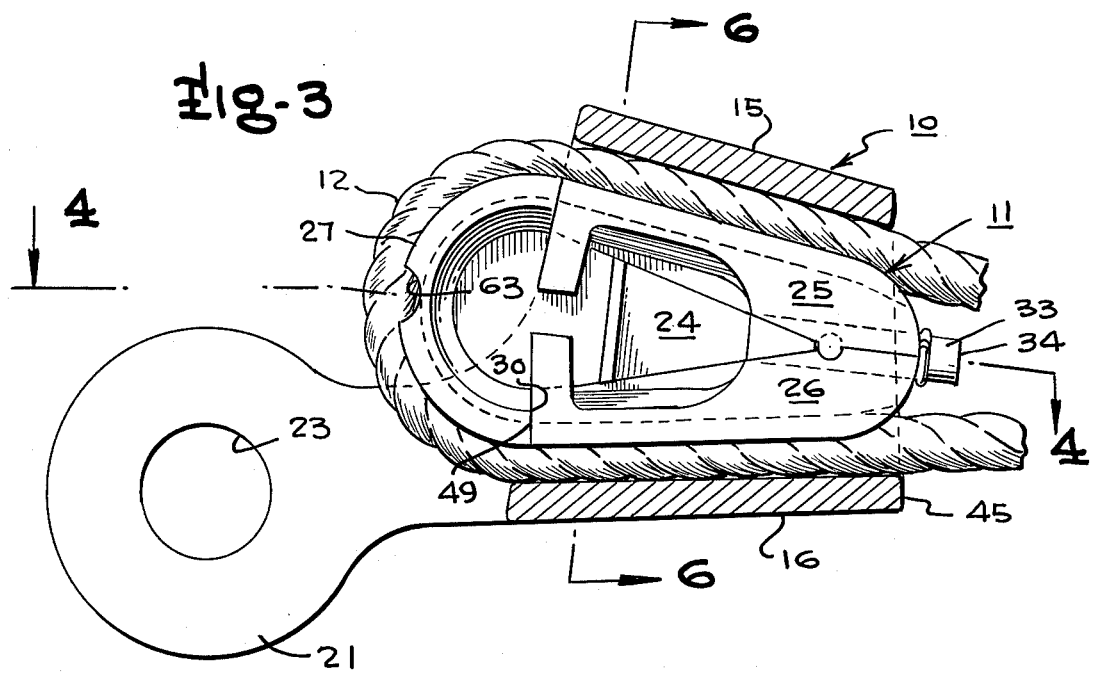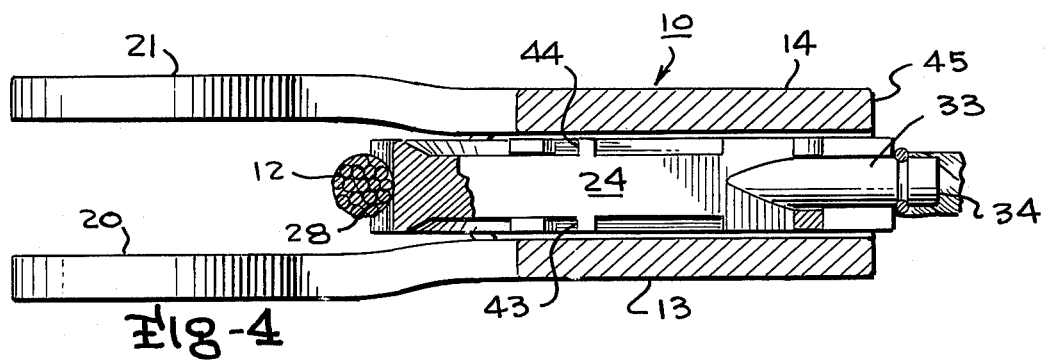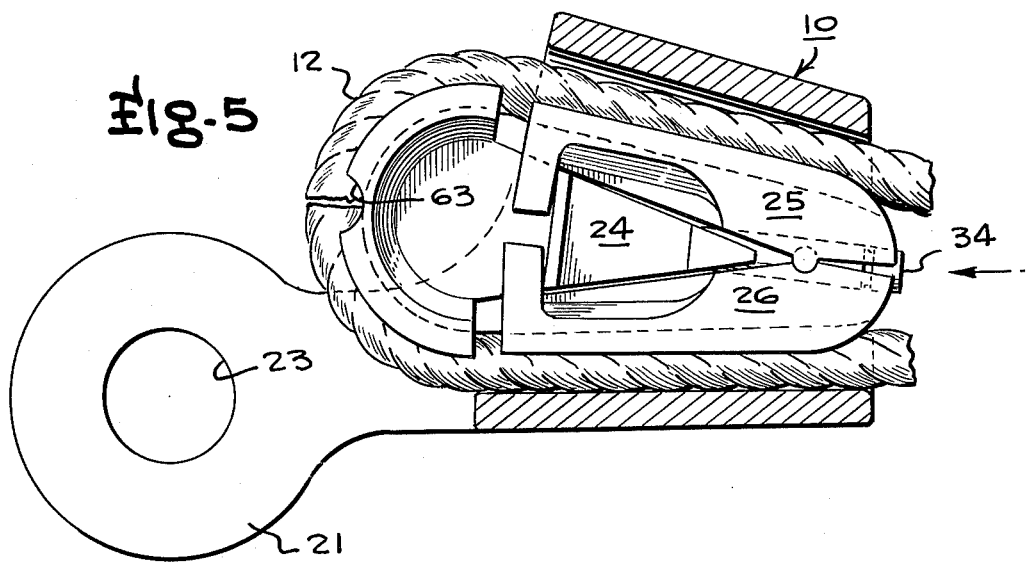

CABLE CONNECTING ASSEMBLY

This invention relates to a connecting assembly and more particularly to cable connecting assembly suitable for use with dragline excavators and the like.

In the prior art, there has been developed a type of assembly for connecting an end of a cable to a component of a dragline excavator and the like, which generally consists of a socket member having a tapered cable receiving opening and means for securing the socket member to another component of the excavator, and a wedge member receivable within the socket member and engagable with a cable segment passing through the socket member to wedge the cable segment within the socket member between the wedge member and the socket member. In such type of assembly, it was found that due to high tension loads applied to the cables connected to such assemblies, considerable difficulty was encountered in removing the wedge members to release the cable from the assembly. In view of such difficulty, there further has been developed in the prior art, a type of assembly as described wherein the wedge member is made up of several components which may be caused to collapse and thus facilitate the removal of the wedge member from the socket member. Such improved type of assembly has greatly facilitated the disassembly of wedge type connector assemblies. However, it further has been found that commercially available cable connecting assemblies of the collapsible wedge type are not entirely effective in providing the disassembly of the unit with a minimum amount of time and effort while preventing damage to any of the components of the assembly.

Accordingly, it is the general object of the present invention to provide an improved connecting assembly.

Another object of the present invention is to provide an improved cable connecting assembly.

A further object of the present invention is to provide an improved assembly suitable for use with dragline excavators and the like for connecting the end of a cable to another component of the excavator.

A still further object of the present invention is to provide an improved cable connecting assembly suitable for use in applications where the cable is subjected to high tensile loads wherein the cable may be removed from the assembly with a minimum amount of time and effort.

Another object of the present invention is to provide an improved cable connecting assembly of the wedge type commonly used in dragline excavators and the like, wherein the wedge component of the assembly may be readily collapsed and removed to facilitate the removal of the cable from the assembly.

A further object of the present invention is to provide an improved cable connecting assembly of the wedge type commonly used in dragline excavators and the like, which is comparatively simple in construction, relatively easily to assemble and disassemble with a minimum of time and effect, and highly reliable in performance.

Other objects and advantages of the present invention will become more apparent to those persons having ordinary skill in the art to which the invention pertains, from the following description taken in conjunction with the accompanying drawings wherein:

FIG. 1 is a prospective view of an embodiment of the invention, illustrating a cable connected thereto;

FIG. 2 is a prespective view of the wedge assembly utilized in the embodiment shown in FIG. 1, illustrating the components thereof in exploded relation;

FIG. 3 is a cross-sectional view taken along line 3—3 in FIG. 1;

FIG. 4 is a cross-sectional view taken along line 4—4 in FIG. 3;

FIg. 5 is a view similar to the view of FIG. 3, illustrating the relative positions of the components of the assembly as the wedge assembly is collapsed during the disassembly of the unit; and FIG. 6 is a cross-sectional view taken along line 6—6 in FIG. 3.

The embodiment illustrated in the drawings generally consists of a socket member 10 and a wedge assembly 11 between which a cable segment 12 is clamped. The socket member includes a pair of transversely spaced side walls 13 and 14 and a pair of upper and lower curved walls 15 and 16 defining a tapered, longitudinal passageway 17 provided with converging, cable engaging surfaces 18 and 19. As best illustrated in FIGS. 3 and 6, the cross-section of passageway 17 decreases from the rear end thereof to the front end thereof and the cable engaging surfaces 18 and 19 are substantially semi-cylindrical in shape. Forming continuations of the lower sections of side walls 13 and 14 are a pair of rearwardly extending arm portions 20 and 21 which provide a bifurcated end of the socket member. Arm portions 20 and 21 are provided with a pair of transversely aligned openings 22 and 23 which are adapted to receive a pin for securing the socket member to another component of the machine or particular piece of equipment with which the invention is used.

Wedge assembly 11 consists of a spreader member 24 and a pair of identical wedge members 25 and 26 which are adapted to be mounted on the spreader member. The spreader member is provided with an arcuate, rear end surface 27 having a transverse axis intersecting the longitudinal center line of the member, and an arcuate recess 28 for receiving a portion of the cable segment clamped within the assembly. As best illustrated in FIG. 3, the diameter of arcuate surface 27 is substantially less than the vertical dimension of the rear end of passageway 17 to permit the cable segment reeved about the groove in the spreader member to pass through passageway 17 and engage cable engaging surfaces 18 and 19 of the socket member. The portion of the spreader member disposed forwardly of arcuate surface 27, is relieved at the upper and lower ends thereof to provide transverse abutment surfaces 29 and 30 and converging, upper and lower wedge seating surfaces 31 and 32. As best shown in FIG. 3, abutment surfaces 29 and 30 lie in radially disposed planes relative to the axis of arcuate end surface 27. Furthermore, it will be noted that the longitudinal center line of the spreader member bisects the angle formed by converging seating surfaces 31 and 32.

Projecting forwardly from converging surfaces 31 and 32 is an anvil portion 33 having a cylindrical surface and a forwardly disposed striking surface 34. Side surfaces 35 and 36 of the spreader member are relieved rearwardly as at 37 and 38 and forwardly as at 39 and 40 to provide a pair of substantially vertically disposed, laterally projecting portions 41 and 42 having rearwardly facing abutment surfaces 43 and 44, as best illustrated in FIG. 4. The transverse dimension between side surfaces 35 and 36 of the spreader member is slightly less than the transverse dimension of passageway 17 so as to permit the insertion of the spreader member into passageway 17. The length of anvil portion 13 also is sufficient to permit the forward end thereof to project beyond front end surface 45 of the socket member when the spreader member is assemblied with wedge members 25 and 26 and such assembly is inserted in an operative position within the socket member.

As previously stated, wedge members 25 and 26 are identical in construction. Accordingly, only the configuration of wedge member 26 will be described, it being understood that a similar description applies to wedge member 25. As best illustrated in FIG. 2, wedge member 26 includes an inner, forwardly disposed mating surface 46 which is adapted to engage a similar surface on wedge member 25 when wedge assembly 11 is in the assemblied condition, and an inner, rearwardly disposed spreader member engaging surface 47. As best shown in FIGS. 2 and 3, the planes of mating surface 46 and spreader member engaging surface 47 intersect along a transverse line, and there is provided a longitudinally disposed recess 48 in both surfaces 46 and 47 for receiving a rearward end of anvil portion 33 when the wedge assembly is in the assemblied condition with mating surface 46 engaging a similar surface on wedge member 25, spreader member engaging surface 47 is seated on seating surface 32 of the spreader member, and a rear end surface 49 engages abutment surface 30 of the spreader member.

Outer surface 50 of wedge member 26 is disposed at an angle relative to inner, spreader member engaging surface 47 and terminates forwardly in an inwardly curved surface 51. As best illustrated in FIG. 6, outer surface 50 is provided with a longitudinal groove 52 for receiving a portion of the cable segment. Groove 52 has a substantially semi-circular cross-sectional configuration to accommodate the cable segment. The transverse dimension between side surfaces 53 and 54 is similar to the transverse dimension between side surfaces 35 and 36 of the spreader member so that when the wedging assembly is in the assemblied condition the wedge members may be received within the socket member.

Provided at the intersection of mating surface 46 and spreader member engaging surface 47 are laterally spaced projection 55 and recess 56. The outer surface of projection 55 and the surface of recess 56 are substantially cylindrical, having a common axis coinciding with the line of intersection of mating surface 46 and spreader member engaging surface 47. When wedge members 25 and 26 are mounted on spreader member 24, projection 55 of wedge member 26 is adapted to be received within recess 56 of wedge member 25 and, similarly, projection 55 of wedge member 25 is adapted to be received within recess 56 of wedge member 26 so that the wedge members may be permitted to pivot relative to each other about a hinge axis coinciding with the line of intersection between mating surface 46 and spreader member engaging surface 47 whenever spreader member 24 is displaced longitudinally relative to wedge members 25 and 26.

The rear end of wedge member 26 further is provided with a pair of upwardly projecting guide arm portions 57 and 58 having inner surfaces engagable with the rearwardly disposed depressed side walls of the spreader member, and forwardly facing surfaces 59 and 60 which are engaged by abutment surface 43 and 44 of the spreader member when the spreader member is displaced rearwardly relative to the wedge members.

To assemble the embodiment of the invention sa described, wedge members 25 and 26 are mounted on the spreader member so that mating surfaces 46 engage, anvil portion 33 is received in grooves 48, each of the projections 55 is received in a recess 56 in the other wedge member, surfaces 47 engage seating surfaces 31 and 32 on the spreader member, rear end surfaces 49 engage abutment surfaces 29 and 30, guide arm portions 57 and 58 engage the depressed side surfaces of the spreader member and surfaces 59 and 60 of the guide arm portions engage abutment surfaces 43 and 44 upon disassembly. With the wedge assembly thus assemblied, the front end thereof is partially inserted into the socket member through the rear end of passageway 17. The cable is then fed through the front end of the socket member between opposed surfaces 18 and 52 of the socket member and wedge member 25, reeved about the rear end of the spreader member and passed through the socket member between surfaces 52 on wedge member 26 and 19 of the socket member. The portions of the cable projecting out of the front end of the socket member are then pulled forwardly so that the wedging assembly moves further into the socket member and the upper and lower segments of the cable engage surfaces 18 and 19 of the socket member. The cable is then placed under tension to drive the wedging assembly forwardly and correspondingly clamp the cable to the socket member. As illustrated in FIG. 3, when the wedge assembly is in the assemblied condition, the surfaces of recesses 52 of the wedge members merge with the surface of recess 28 in the spreader member to provide a continuous peripheral groove in the wedging assembly for the cable segment.

The positioning and alignment of the wedge members on the spreader member further may be aided by the use of a grommet 61 fitted on the forwardly disposed portion of the anvil, within a seating groove 62. Such grommet would serve as an abutment or limit stop for the forwardly disposed portions of the wedge members. Such abutment means also could be formed integral with the anvil on the outer end of the anvil could be provided with a section of greater diameter providing an annular abutment shoulder engageable by the front ends of the wedge members.

When the embodiment is in the assemblied condition as illustrated in FIG. 3, the forwardly disposed portion of anvil 33 projects forwardly of the front end of the socket member so that whenever it is desired to disassemble the assembly and remove the cable, it is necessary only to remove the tensile load from the cable thus removing the clamping force on the cable segment within the socket member, and striking the outer surface 34 of the anvil to separate the spreader member from the wedge members. Under such conditions, the wedging assembly will collapse to free the cable segment within the socket member, as illustrated in FIG. 5. Under certain conditions, it may be necessary or desirable to sever the cable segment reeved about the spreader member by burning the segment with a torch. To facilitate such operation and prevent damage to the spreader member, a transverse recess 63 is provided in arcuate surface 27 to expose a greater surface of the cable segment.

The components of the assembly including the socket member, the spreader member and the wedge members may be fabricated of any suitable material having sufficient strength and wear characteristics, and further may be fabricated by any suitable method including casting and forging.

From the foregoing detailed description, it will be evident that there are a number of changes, adaptations and modifications of the present invention which will come within the province of those persons having oridinary skill in the art to which the present invention pertains. However, it is intended that all such variations not departing from the spirit of the invention be considered within the scope thereof as limited solely by the appended claims.

I claim:

1. A cable connecting assembly comprising a socket member having a passageway therethrough including converging, cable segment engaging surfaces and means for securing said socket member to a desired object, and a wedge assembly receivable within the passageway of said socket member including a pair of wedge members and a wedge shaped spreader member therebetween, said spreader member having a pair of converging, wedge seating surfaces, a forwardly projecting anvil disposed at the narrow forward end thereof, extending beyond a forward end of and outside said socket member when said wedge assembly is disposed within the passageway of said socket member, and a cable engaging surface disposed at the wide rearward end thereof, each of said wedge members including a surface engagable with a wedge seating surface of spreader member and a surface engagable with a cable segment engaging a converging surface of said socket member when said wedge assembly is disposed within the passageway of said socket member.

2. A cable connecting assembly according to claim 1, wherein said socket member includes a pair of transversely spaced side walls and said securing means comprise rearwardly extending portions of said side walls, providing a bifurcated end portion of said socket member, said bifurcated end portion including transversely aligned, pin receiving openings.

3. A cable connecting assembly according to claim 1 wherein said cable engaging surface of said spreader member is arcuate.

4. A cable connecting assembly according to claim 1 wherein said wedge and spreader members include grooves defining said cable engaging surfaces.

5. A cable connecting assembly according to claim 4 wherein said grooves and said cable engaging surfaces of said socket member are provided with semi-circular cross-sectional configurations.

6. A cable connecting assembly according to claim 4 wherein the surfaces of said grooves merge into each other to form a continuous peripheral groove for receiving a cable segment about the wedge assembly in wrap-around relation.

7. A cable connecting assembly according to claim 4 wherein said spreader member is provided with a transversely disposed groove communicating with the cable receiving groove thereof to expose additional side surface portions of the cable segment disposed in the cable receiving groove of said spreader member.

8. A cable connecting assembly according to claim 1 wherein each of said wedge members includes a pair of transversely spaced, guide arm portions which engage side surfaces of said spreader member when said wedge member is mounted on said spreader member in assemblied relation.

9. A cable connecting assembly according to claim 8, wherein sides of said spreader member are relieved to provide surfaces engagable by said guide arm portions.

10. A cable connecting assembly according to claim 1 wherein each of said wedge members includes a recess for receiving an inner portion of said anvil when said wedge assembly is in the assemblied condition.

11. A cable connecting assembly according to claim 1 wherein said anvil is provided with abutment means engagable by front end portions of said wedge members when said engaging surfaces of said wedge members are positioned on said wedge seating surfaces of said spreader member.

12. A cable connecting assembly according to claim 11, wherein said abutment means comprises a grommet fitted on said anvil.

13. A cable connecting assembly according to claim 1 wherein each of said wedge members includes a forwardly disposed mating surface having a plane intersecting the plane of the spreader member engaging surface thereof, engageable with a similar surface on the other of said wedge members when said wedge assembly is in the assemble condition.

14. A cable connecting assembly according to claim 13 wherein the spreader member seating surface and mating surface of each of said wedge members includes a recess for receiving an inner portion of said anvil therein when said wedge and spreader members are in assemblied relation.

15. A cable connecting assembly according to claim 14 wherein said anvil has a cylindrical cross-sectional configuration for the greater part of its length, and the anvil receiving recess of each of said wedge members has an arcuate cross-sectional configuration.

16. A cable connecting assembly according to claim 14 wherein said wedge members have cooperating hinge components when in assemblied relation, having a hinge axis coinciding with the line of intersection of the planes of said spreader member seating surface and said mating surface of each of said wedge members.

17. A cable connecting assembly according to claim 16 wherein said hinge means comprises a laterally offset, rounded projection on each of said wedge members received in a similarly configured recess in the other of said wedge members when said wedge members are disposed in assemblied relation.

* * * * *